(12) United States Patent
Matsuura

(10) Patent No.: US 6,731,852 B2
(45) Date of Patent: May 4, 2004

(54) SLACK STORAGE APPARATUS FOR OPTICAL FIBERS

(75) Inventor: Hideki Matsuura, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 10/142,970

(22) Filed: May 13, 2002

(65) Prior Publication Data

US 2002/0168167 A1 Nov. 14, 2002

(30) Foreign Application Priority Data

May 14, 2001 (JP) .................................... 2001-142587

(51) Int. Cl.[7] .............................................. G02B 6/00
(52) U.S. Cl. ..................................................... 385/135
(58) Field of Search ................................. 385/135, 136, 385/147

(56) References Cited

U.S. PATENT DOCUMENTS

| | | | | |
|---|---|---|---|---|
| 4,911,521 A | * | 3/1990 | Ryuto et al. ................. | 385/135 |
| 5,511,144 A | * | 4/1996 | Hawkins et al. ............. | 385/135 |
| 5,546,495 A | * | 8/1996 | Bruckner et al. ............ | 385/135 |
| 6,009,224 A | * | 12/1999 | Allen .......................... | 385/135 |
| 6,215,938 B1 | * | 4/2001 | Reitmeier et al. ........... | 385/135 |
| 6,434,314 B1 | * | 8/2002 | Gatica et al. ................ | 385/136 |

FOREIGN PATENT DOCUMENTS

JP          7-63925          3/1995

\* cited by examiner

*Primary Examiner*—Tulsidas C. Patel
(74) *Attorney, Agent, or Firm*—McDermott, Will & Emery (57) ABSTRACT

A slack storage assembly for storing optical fibers 11 includes fixed plates 51 disposed in horizontal posture, first movable plates 52 disposed parallel to the fixed plates 51 to be movable toward and away from the fixed plates 51, and second movable plates 53 disposed parallel to the first movable plates 52 to be movable toward and away from the first movable plates 52. The optical fibers 11 are fixed as pinched between the fixed plates 51 and first movable plates 52 and between the first movable plates 52 and second movable plates 53.

6 Claims, 8 Drawing Sheets

SLACK STORAGE APPARATUS FOR OPTICAL FIBERS

BACKGROUND OF THE INVENTION

1. Field of the Invention

The present invention relates an apparatus for storing slacks of optical fibers extending from optical devices.

2. Description of the Related Art

When connecting optical devices such as semiconductor lasers to an optical system by using optical fibers, for example, longer optical fibers than are necessary for the connection are used in order to obtain excellent characteristics. Consequently, it is necessary to deal with slacks of the optical fibers extending from the optical devices.

Conventionally, such slacks are dealt with by simply leaving the optical fibers as they are without supporting them, or by placing the optical fibers on a support member.

Where the optical fibers are left as they are without support or placed on a support member, the optical fibers could move and vary the curvature thereof. When the optical fibers move and vary the curvature thereof, variations will occur in the emission pattern of the luminous flux emitted from the optical fibers, to produce an adverse effect upon the light transmission characteristics.

Thus, as described in Japanese Patent Publication (Unexamined) No. 1995-63925, optical fibers may be fixed by winding slacks thereof around guide members or the like. In such a case, however, maintainability is poor in time of changing optical devices or optical fibers.

SUMMARY OF THE INVENTION

The object of this invention, therefore, is to provide a slack storage apparatus for storing slacks of optical fibers, which realizes an improvement in maintainability while preventing movement of the optical fibers to avoid deterioration in transmission characteristics.

The above object is fulfilled, according to the present invention, by a slack storage apparatus for storing slacks of optical fibers extending from optical devices, the apparatus comprising a fixed plate disposed in horizontal posture, and at least one movable plate disposed parallel to the fixed plate to be movable toward and away from the fixed plate, wherein, when the movable plate is moved toward the fixed plate, one of the optical fibers is fixedly pinched between the fixed plate and the movable plate.

This slack storage apparatus for storing optical fibers is capable of fixedly pinching the optical fibers. Thus, deterioration in transmission characteristics due to movement of the optical fibers is effectively avoided. In addition, the optical fibers may easily be released from the fixed state to realize improved maintainability.

In another aspect of the invention, a slack storage apparatus is provided for storing slacks of optical fibers extending from optical devices, the apparatus comprising a plurality of optical fiber fixing units arranged one over another, each of the optical fiber fixing units including a fixed plate disposed in horizontal posture, and at least one movable plate disposed parallel to the fixed plate to be movable toward and away from the fixed plate, wherein, when the movable plate is moved toward the fixed plate, one of the optical fibers is fixedly pinched between the fixed plate and the movable plate.

In a further aspect of the invention, a slack storage apparatus is provided for storing slacks of optical fibers extending from optical devices, the apparatus comprising a plurality of optical fiber fixing units arranged one over another, each of the optical fiber fixing units including a fixed plate disposed in horizontal posture, a first movable plate disposed parallel to the fixed plate to be movable toward and away from the fixed plate, a second movable plate disposed parallel to the first movable plate to be movable toward and away from the first movable plate, and a plate moving mechanism for synchronously moving the first movable plate toward the fixed plate and the second plate toward the first movable plate, wherein the optical fibers are fixedly pinched between the fixed plate and the first movable plate and between the first movable plate and the second movable plate.

In a still further aspect of the invention, a slack storage apparatus is provided for storing slacks of optical fibers extending from optical devices, the apparatus comprising fixed shafts extending vertically, movable shafts movable vertically and having large diameter portions and small diameter portions arranged alternately, a plurality of fixed plates fixed to the fixed shafts, first movable plates disposed parallel to the fixed plates and corresponding in number to the fixed plates, the first movable plates defining bores smaller than the large diameter portions and larger than the small diameter portions, the small diameter portions extending through the bores, and second movable plates fixed to the movable shafts and corresponding in number to the first movable plates, the second movable plates being parallel to the first movable plates and opposed to the fixed plates across the first movable plates, wherein, with movement of the movable shafts, the optical fibers are fixedly pinched between the fixed plates and the first movable plates and between the first movable plates and the second movable plates, respectively.

Other features and advantages of the present invention will be apparent from the following detailed description of the embodiment of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENT

An embodiment of the present invention will be described hereinafter with reference to the drawings.

Figure 1:
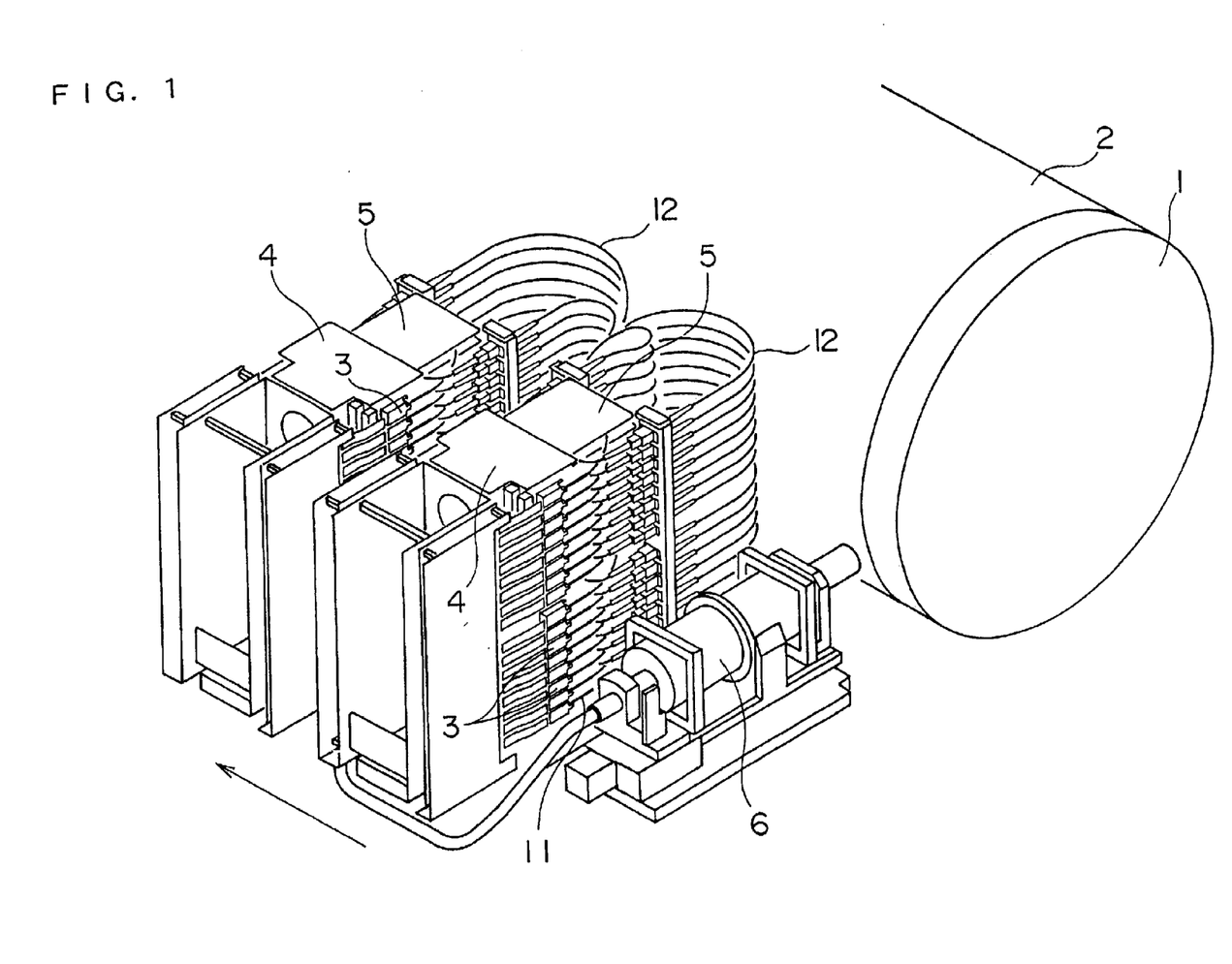
FIG. 1 is a perspective view of a principal portion of an image recording apparatus including a device supporting assembly.

The construction of an image recording apparatus having an optical fiber slack storage apparatus according to the invention will be described first. FIG. 1 is a perspective view of a principal portion of the image recording apparatus including a slack storage assembly 5 acting as the slack storage apparatus according to the invention.

This image recording apparatus is used to record images on a sensitive material 2 mounted peripherally of a drum 1 by emitting a laser beam from an imaging optical system 6. The apparatus includes a device supporting assembly 4 for supporting numerous semiconductor lasers 3 acting as devices requiring temperature control, and the slack storage assembly 5 for supporting numerous optical fibers 11 optically connecting the semiconductor lasers 3 to the imaging optical system 6.

In this image recording apparatus, the imaging optical system 6 emits a laser beam modulated according to image signals while the drum 1 is rotated by a motor not shown, and a recording head having the device supporting assembly 4, slack storage assembly 5 and imaging optical system 6 is moved in a direction indicated by an arrow in FIG. 1. In this way, the laser beam scans the sensitive material 2 to record an image thereon.

Figure 2:
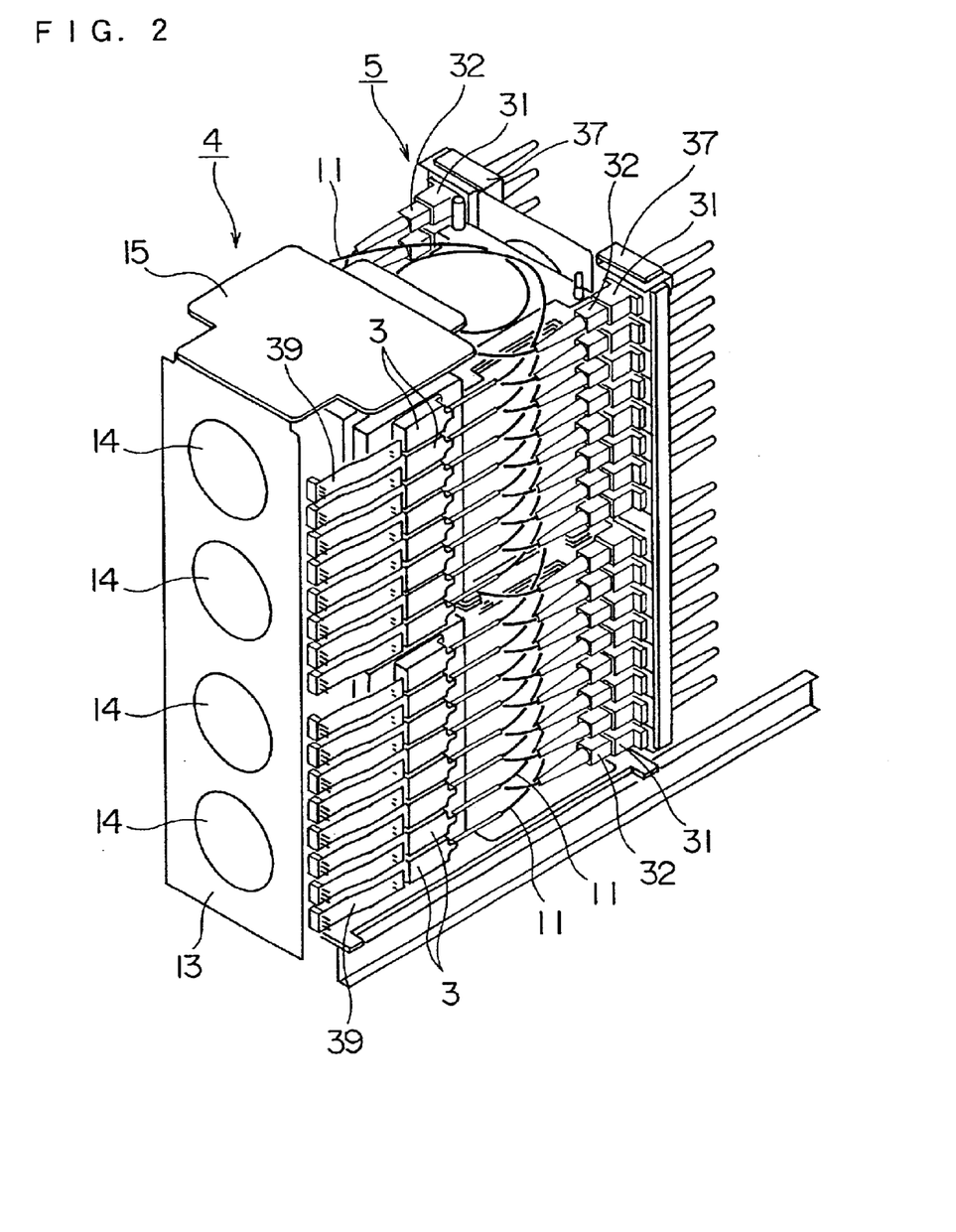
FIG. 2 is an enlarged perspective view of a portion of the image recording apparatus including the device supporting assembly and a slack storage assembly.

FIG. 2 is an enlarged perspective view of a portion of the image recording apparatus including the device supporting assembly 4 and slack storage assembly 5 shown in FIG. 1. FIG. 2 shows only one half of the device supporting assembly 4 and one half of the slack storage assembly 5 provided for the image recording apparatus. The slack storage assembly 5 has a casing 71 to be described hereinafter, which is omitted from FIG. 2.

One half of the device supporting assembly 4 supports a total of 32 semiconductor lasers 3 arranged on right and left side surfaces thereof (only 16 lasers on the right side surface being shown in FIG. 2). The device supporting assembly 4 has a top plane closed by a cover 15, and a rear plane closed by a cover 13. The cover 13 defines vent openings 14.

Each semiconductor laser 3 is connected at an exit end thereof to one of the optical fibers 11. The end of each optical fiber 11 remote from the semiconductor laser 3 is connected to a connector 32. The portion of each optical fiber 11 extending from the semiconductor laser 3 to the connector 32 is fixedly supported by the slack storage assembly 5. Each connector 32 is connected to an adaptor 31. These adaptors 31 are connected to optical fibers 12 connected to the imaging optical system 6 (FIG. 1). Numeral 39 in FIG. 2 denotes transmission lines for transmitting electrical signals to drive the respective semiconductor lasers 3.

The optical fibers 11 connected to the semiconductor lasers 3 are detached along with the connectors 32 from the adapters 31 when changing or maintaining the semiconductor lasers 3. Thus, the optical fibers 11 are detachably fixed to the slack storage assembly 5. The optical fibers 12 connecting the adaptors 31 to the imaging optical system 6 are immovably fixed by a fixing device not shown in FIG. 1.

Figure 3:
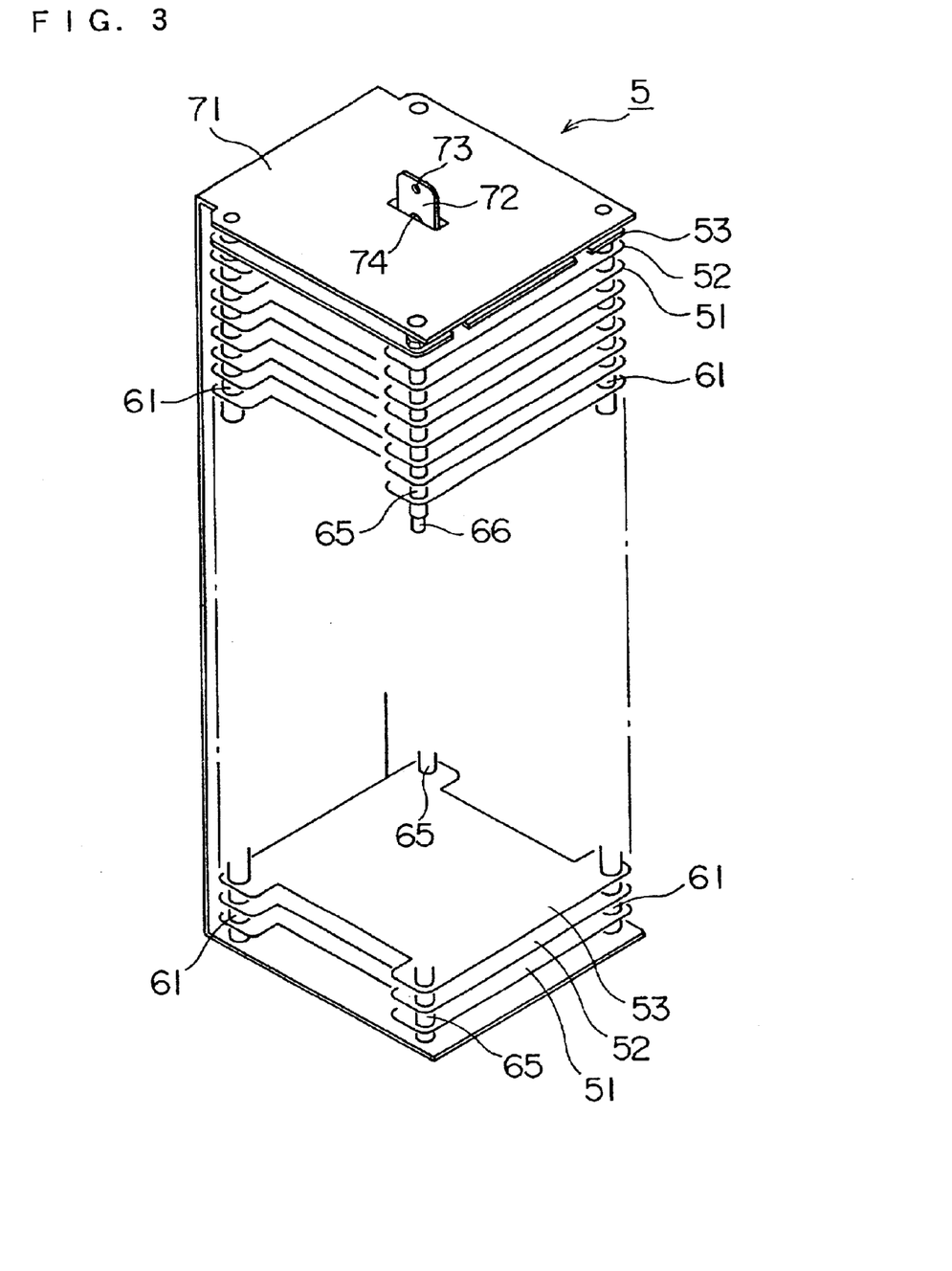
FIG. 3 is a perspective view, partly broken away, of the slack storage assembly.
Figure 4:
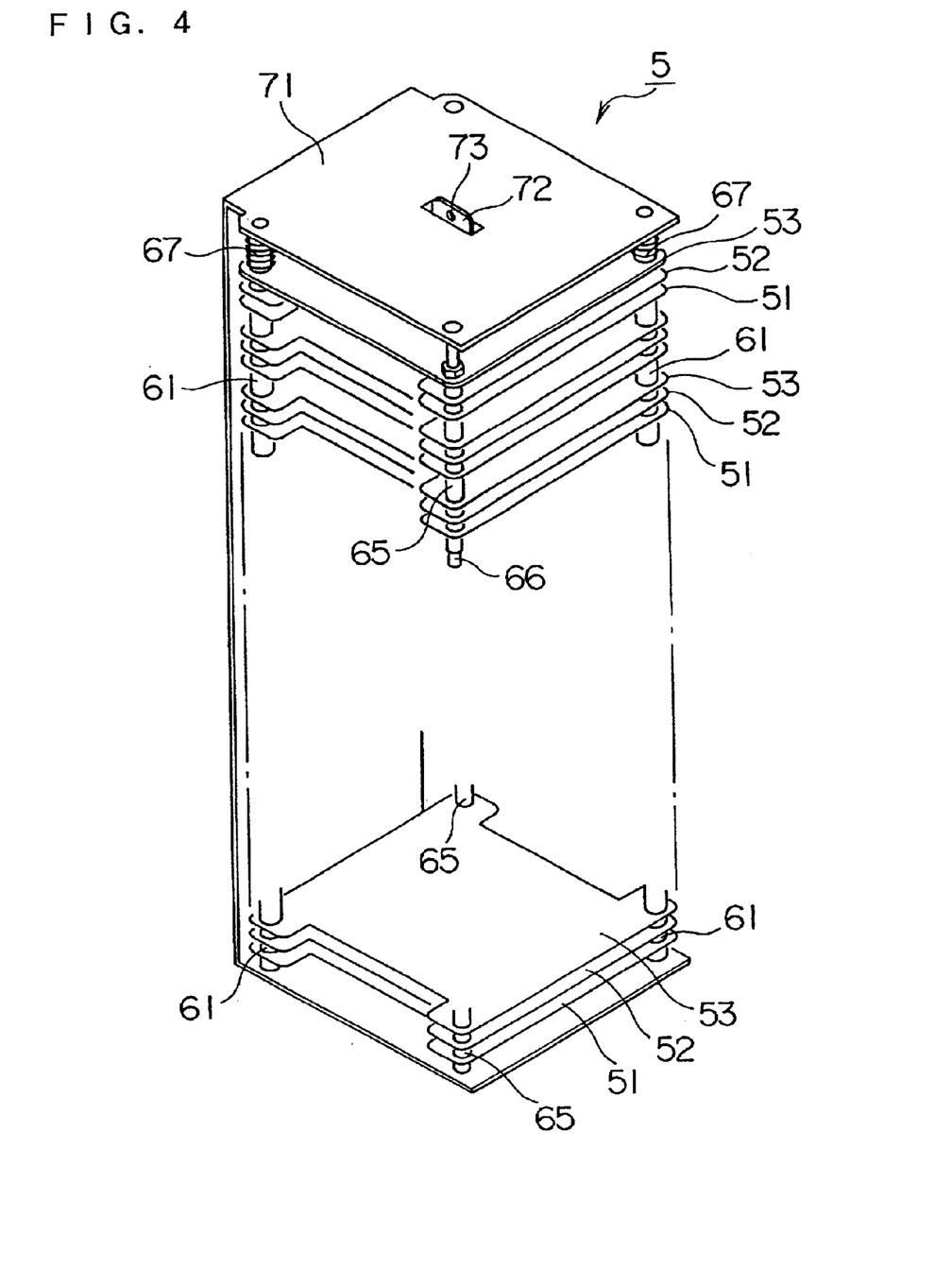
FIG. 4 is a perspective view, partly broken away, of the slack storage assembly.
Figure 5:
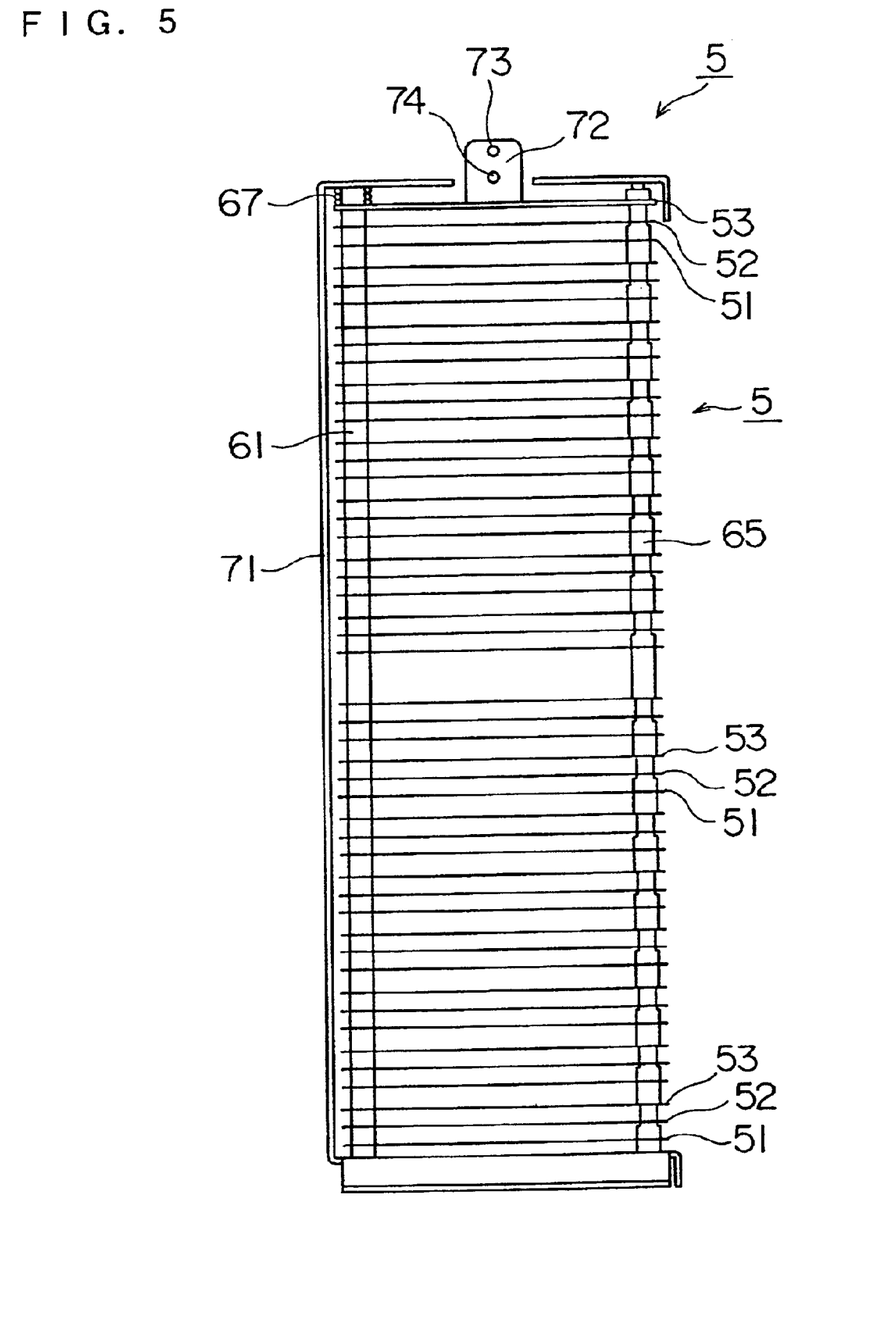
FIG. 5 is a side view of the slack storage assembly.
Figure 6:
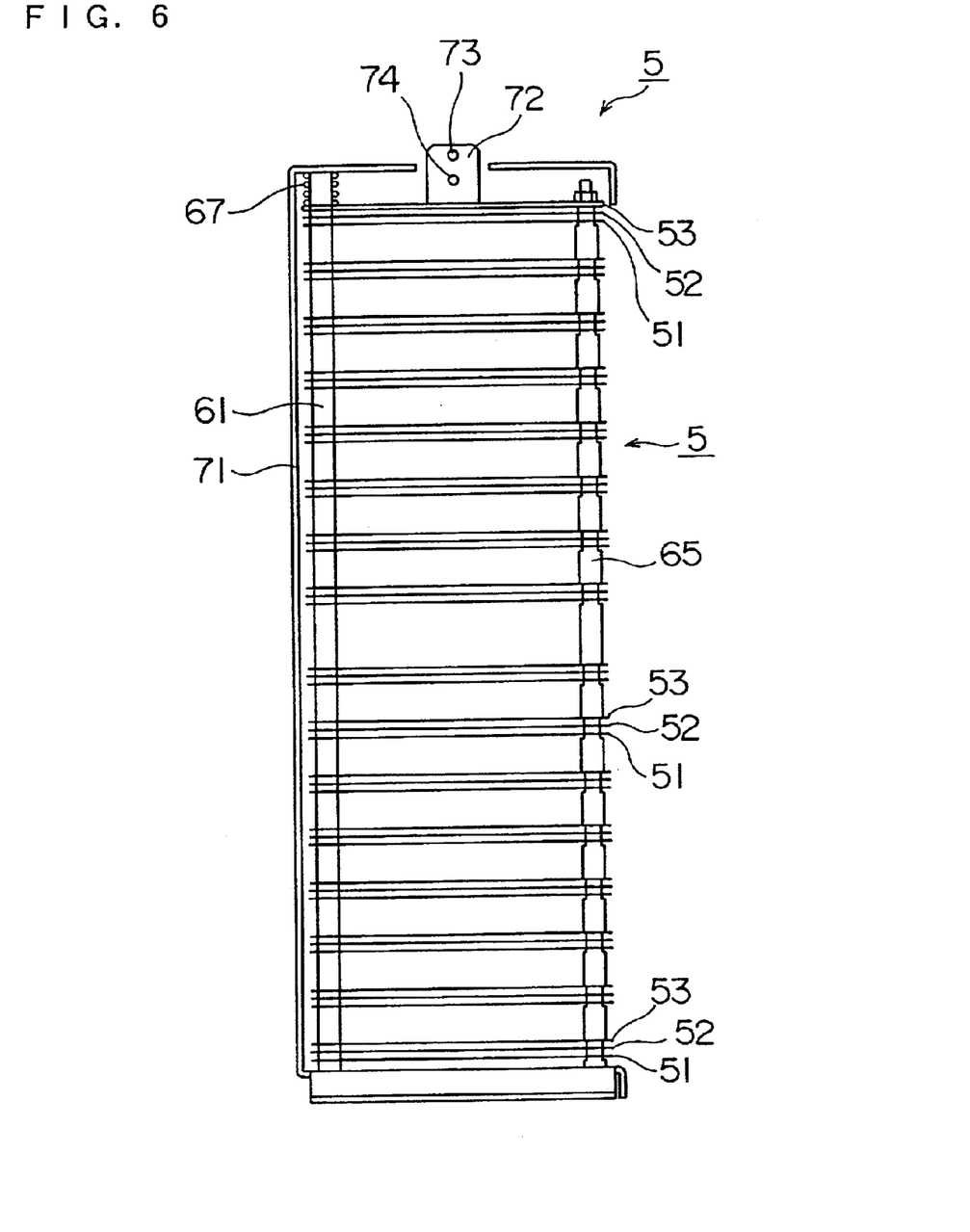
FIG. 6 is a side view of the slack storage assembly.
Figure 7:
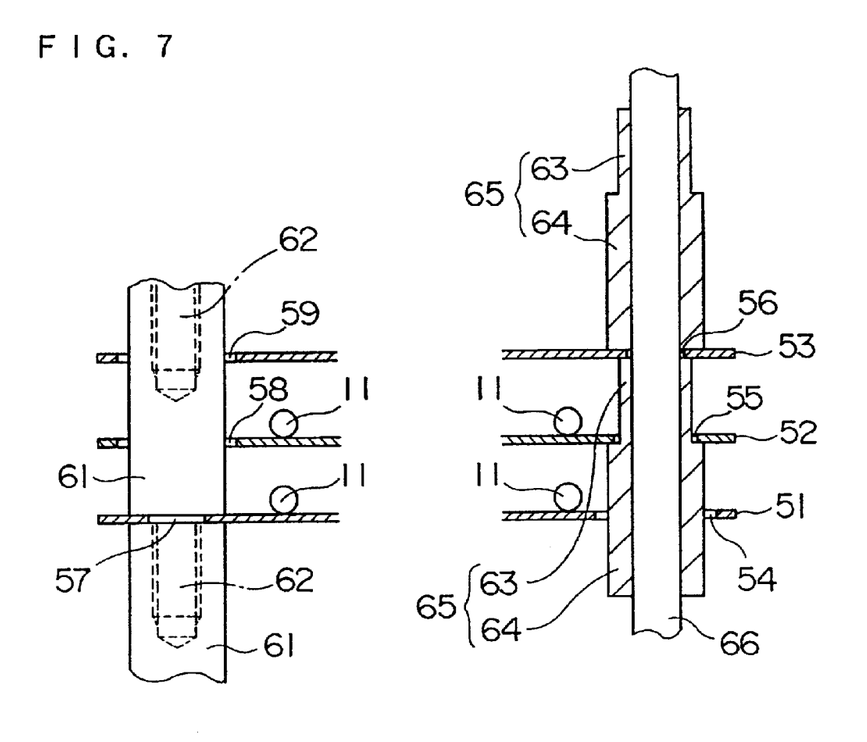
FIG. 7 is an enlarged fragmentary view of the slack storage assembly.
Figure 8:
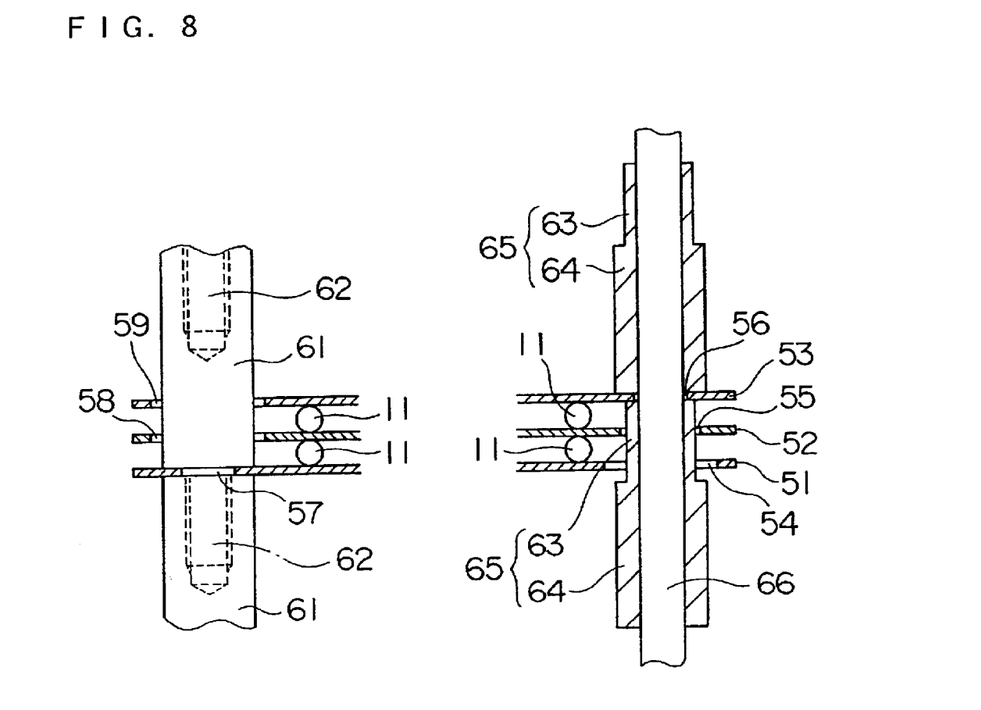
FIG. 8 is an enlarged fragmentary view of the slack storage assembly.

The construction of the slack storage assembly 5 acting as the slack storage apparatus according to the invention will be described next. FIGS. 3 and 4 are perspective views, partly broken away, of the slack storage assembly 5. FIGS. 5 and 6 are side views of the slack storage assembly 5. FIGS. 7 and 8 are enlarged fragmentary views of the slack storage assembly. FIGS. 3, 5 and 7 show a state in which the optical fibers 11 are not fixed. FIGS. 4, 6 and 8 show a state in which the optical fibers 11 are fixed as pinched by fixed plates 51, first movable plates 52 and second movable plates 53.

Each fixed plate 51, first movable plate 52 and second movable plate 53, combined with a fixed shaft unit 61 and a movable shaft unit 65, constitute a fiber fixing unit. The slack storage assembly 5 includes a plurality of such fiber fixing units arranged one over another inside a casing 71 having an approximately U-shaped section.

As shown in FIGS. 7 and 8, each fixed shaft unit 61 has a threaded bore formed at an upper end thereof, and a screw 62 at a lower end for engaging the threaded bore of a next lower fixed shaft unit 61. Such shaft units 61 are coaxially connected end to end by using the screws 62, to form two fixed shafts as shown in FIGS. 3 and 4. These shafts are fixed at upper and lower ends thereof to the casing 71.

As shown in FIGS. 7 and 8, each movable shaft unit 65 is in the form of a hollow shaft having a small diameter portion 63 and a large diameter portion 64. A fixed support rod 66 extends through the movable shaft units 65. Thus, two movable shafts are formed as shown in FIGS. 3 and 4. These movable shafts are movable up and down relative to the casing 71.

As shown in FIGS. 7 and 8, each fixed plate 51 has bores 57 formed in two corners thereof and having an inside diameter larger than an outside diameter of the screws 62 of the fixed shaft units 61 and smaller than an outside diameter of the fixed shaft units 61. Thus, the fixed plate 51 is fixed to the fixed shafts as held between the fixed shaft units 61. Each fixed plate 51 has bores 54 formed in the two other corners thereof and having an inside diameter larger than an outside diameter of the large diameter portions 64 of the movable shaft units 65. Thus, the fixed plate 51 is freely movable up and down relative to the movable shaft units 65.

As shown in FIGS. 7 and 8, each first movable plate 52 has bores 58 formed in two corners thereof and having an inside diameter larger than the outside diameter of the fixed shaft units 61. Thus, the first movable plate 52 is freely movable up and down relative to the fixed shaft units 61. Each first movable plate 52 has bores 55 formed in the two other corners thereof and having an inside diameter larger than an outside diameter of the small diameter portions 63 of the movable shaft units 65, and smaller than the outside diameter of the large diameter portions 64 of the movable shaft units 65. Thus, the first movable plate 52 is freely movable up and down only within a region outside the small diameter portion 63 of each movable shaft unit 65.

As shown in FIGS. 7 and 8, each second movable plate 53 has bores 59 formed in two corners thereof and having an inside diameter larger than the outside diameter of the fixed shaft units 61. Thus, the second movable plate 53 is freely movable up and down relative to the fixed shaft units 61. Each second movable plate 53 has bores 56 formed in the two other corners thereof and having an inside diameter larger than an outside diameter of the support rods 66 and smaller than the outside diameter of the small diameter portions 63 of the movable shaft units 65. Thus, the second movable plate 53 is fixed to the movable shafts as held between the movable shaft units 65.

As shown in FIGS. 3 through 6, the second movable plate 53 of the uppermost optical fiber fixing unit has a pulling member 72 attached to the upper surface thereof and defining a pair of bores 73 and 74. Further, springs 67 are arranged between the second movable plate 53 of the uppermost optical fiber fixing unit and a top plate of the casing 71 for biasing the second movable plate 53 downward.

With the slack storage assembly 5 having the above construction, the optical fibers 11 are normally fixed inside the slack storage assembly 5. When changing or maintaining the semiconductor lasers 3, the optical fibers 11 are released from the fixed state.

To release the optical fibers 11 for changing or maintaining the semiconductor lasers 3, the second movable plate 53 of the uppermost optical fiber fixing unit is raised, along with the movable shafts including the numerous movable shaft units 65, against the biasing force of springs 67, by using the bore 73 of the pulling member 72. Then, the movable shafts are stopped in place such as by inserting a fixing bar, not shown, into the bore 74 of the pulling member 72.

In this state, as shown in FIG. 7, each second movable plate 53 is raised along with the movable shaft units 65 constituting the movable shafts. Each first movable plate 52 is raised after the lower surface thereof contacts the upper ends of the large diameter portions 64 of the movable shaft units 65. The fixed plates 51 remain stationary. Thus, as shown in FIGS. 3, 5 and 7, the fixed plates 51, first movable plates 52 and second movable plates 53 stop in equidistantly spaced positions. In this state, the optical fibers 11 are released.

To reinstate the optical fibers 11 in the normal, fixed state for an image recording operation after the semiconductor lasers 3 are changed or maintained, the pulling member 72 is released. Then, the second movable plate 53 of the uppermost optical fiber fixing unit is lowered, along with the movable shafts including the numerous movable shaft units 65, by the action of springs 67.

In this state, as shown in FIG. 8, each second movable plate 53 is lowered with the movable shaft units 65 constituting the movable shafts. Each first movable plate 52 descends as a result of loss of the support by the upper ends of the large diameter portions 64 of the movable shaft units 65. Consequently, as shown in FIGS. 4, 6 and 8, the fixed plates 51, first movable plates 52 and second movable plates 53 stop in positions holding the optical fibers 11 between each adjacent pair of fixed plate 51 and first movable plate 52 and between each adjacent pair of first movable plate 52 and second movable plate 53.

In this state, the optical fibers 11 are fixedly pinched, by the action of springs 67, between each adjacent pair of fixed plate 51 and first movable plate 52 and between each adjacent pair of first movable plate 52 and second movable plate 53. Thus, the optical fibers are effectively maintained immovable to avoid variations in the curvature thereof which would produce an adverse effect upon the light transmission characteristics.

In the above embodiment, two, first and second, movable plates 52 and 53 are used for each fixed plate 51, and the optical fibers 11 are fixedly pinched between the fixed plate 51 and first movable plate 52 and between the first movable plate 52 and second movable plate 53. Instead, one movable plate may be used for each fixed plate, with an optical fiber fixedly pinched between the fixed plate and movable plate.

In the described embodiment, two optical fibers 11 may be fixed by three plates 51, 52 and 53. The alternative construction noted above fixes each optical fiber with two plates, and thus has a disadvantage of requiring an increased number of plates.

Conversely, to fix more optical fibers with fewer plates, an increased number of movable plates may be used for each fixed plate. The optical fibers may be fixedly pinched between these fixed plate and movable plates.

However, use of too many movable plates for each fixed plate will bring about an inconvenience that the optical fibers pinched by the movable plates arranged remote from each fixed plate are moved by large extents between the pinched state and released state.

The present invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2001-142587 filed in the Japanese Patent Office on May 14, 1997, the entire disclosure of which is incorporated herein by reference.

What is claimed is:

1. A slack storage apparatus for storing slacks of optical fibers extending from optical devices, said apparatus comprising:
   a fixed plate disposed in horizontal posture; and
   at least one movable plate disposed parallel to said fixed plate to be movable toward and away from said fixed plate in a plane parallel to the plane of the fixed plate;
   wherein, when said movable plate is moved toward said fixed plate, one of said optical fibers is able to be fixed by the movable plate between said fixed plate and said movable plate, and when said movable plate is moved away from said fixed plate, said one of said optical fibers is able to be released between said fixed plate and said movable plate.

2. A slack storage apparatus for storing slacks of optical fibers extending from optical devices, said apparatus comprising a plurality of optical fiber fixing units arranged one over another, each of said optical fiber fixing units including:
   a fixed plate disposed in horizontal posture; and
   at least one movable plate disposed parallel to said fixed plate to be movable toward and away from said fixed plate in a plane parallel to the plane of the fixed plate;
   wherein, when said movable plate is moved toward said fixed plate, one of said optical fibers is able to be fixed by the movable plate between said fixed plate and said movable plate, and when said movable plate is moved away from said fixed plate, said one of said optical fibers is able to be released between said fixed plate and said movable plate.

3. A slack storage apparatus for storing slacks of optical fibers extending from optical devices, said apparatus comprising a plurality of optical fiber fixing units arranged one over another, each of said optical fiber fixing units including:
   a fixed plate disposed in horizontal posture;
   a first movable plate disposed parallel to said fixed plate to be movable toward and away from said fixed plate;
   a second movable plate disposed parallel to said first movable plate to be movable toward and away from said first movable plate; and
   a plate moving mechanism for synchronously moving said first movable plate toward said fixed plate and said second movable plate toward said first movable plate;
   wherein said optical fibers are able to be fixed between said fixed plate and said first movable plate and between said first movable plate and said second movable plate.

4. A slack storage apparatus for storing slacks of optical fibers extending from optical devices, said apparatus comprising:
   fixed shafts extending vertically;
   movable shafts movable vertically and having large diameter portions and small diameter portions arranged alternately;

a plurality of fixed plates fixed to said fixed shafts;

first movable plates disposed parallel to said fixed plates and corresponding in number to said fixed plates, said first movable plates defining bores smaller than said large diameter portions and larger than said small diameter portions, said small diameter portions extending through said bores; and second movable plates fixed to said movable shafts and corresponding in number to said first movable plates, said second movable plates being parallel to said first movable plates and opposed to said fixed plates across said first movable plates;

wherein, with movement of said movable shafts, said optical fibers are able to be fixed between said fixed plates and said first movable plates and between said first movable plates and said second movable plates, respectively.

5. The slack storage apparatus as defined in claim 1, wherein said at least one movable plate comprises plural movable plates, said apparatus further comprising a plate moving mechanism for synchronously moving each of said plural movable plates toward and away from said fixed plate corresponding to each of said plural movable plates.

6. The slack storage apparatus as defined in claim 2, wherein said at least one movable plate comprises plural movable plates, each of said optical fiber fixing units further including a plate moving mechanism for synchronously moving each of said plural movable plates toward and away from said fixed plate corresponding to each of said plural movable plates.

* * * * *